(12) United States Patent
Anderson et al.

(10) Patent No.: US 9,148,637 B2
(45) Date of Patent: Sep. 29, 2015

(54) FACE DETECTION AND TRACKING

(75) Inventors: Sean Eron Anderson, Bellevue, WA (US); Christian F. Huitema, Clyde Hill, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 491 days.

(21) Appl. No.: 13/288,964

(22) Filed: Nov. 4, 2011

(65) Prior Publication Data
US 2013/0113956 A1    May 9, 2013

(51) Int. Cl.
| | | |
|---|---|---|
| *H04N 9/73* | (2006.01) | |
| *G06F 3/01* | (2006.01) | |
| *G06K 9/00* | (2006.01) | |
| *G06K 9/20* | (2006.01) | |
| *H04N 13/02* | (2006.01) | |
| *H04N 13/00* | (2006.01) | |
| *H04N 13/04* | (2006.01) | |

(52) U.S. Cl.
CPC ............... *H04N 9/735* (2013.01); *G06F 3/011* (2013.01); *G06F 3/017* (2013.01); *G06K 9/00201* (2013.01); *G06K 9/00234* (2013.01); *G06K 9/2018* (2013.01); *G06K 9/2027* (2013.01); *G06K 9/2054* (2013.01); *H04N 13/0022* (2013.01); *H04N 13/0271* (2013.01); *H04N 13/0468* (2013.01)

(58) Field of Classification Search
CPC ............... H04N 9/735; H04N 13/0022; H04N 13/0271; G06F 3/017; G06K 9/00201; G06K 9/00234; G06K 9/2018; G06K 9/2027; G06K 9/2054

USPC ......... 348/223.1, 229.1, 364, 42, 43, 47, 169, 348/172
See application file for complete search history.

(56) References Cited

U.S. PATENT DOCUMENTS

| | | | | |
|---|---|---|---|---|
| 5,019,894 | A * | 5/1991 | Hieda et al. ................. | 348/224.1 |
| 6,301,440 | B1 * | 10/2001 | Bolle et al. .................... | 396/128 |
| 6,678,407 | B1 * | 1/2004 | Tajima .......................... | 382/167 |
| 7,460,695 | B2 | 12/2008 | Steinberg et al. | |
| 7,466,866 | B2 | 12/2008 | Steinberg | |
| 7,800,687 | B2 | 9/2010 | Khan et al. | |
| 2004/0179113 | A1 * | 9/2004 | Suzuki ....................... | 348/223.1 |
| 2005/0057666 | A1 | 3/2005 | Hu et al. | |
| 2007/0182845 | A1 | 8/2007 | Hunter | |
| 2007/0212054 | A1 * | 9/2007 | Kobayashi ................... | 396/165 |

(Continued)

OTHER PUBLICATIONS

Nourani-Vatani, et al., "Automatic Camera Exposure Control", Retrieved at <<http://citeseer.ist.psu.edu/viewdoc/download-?doi=10.1.1.94.5085&rep=rep1&type=pdf>>, Proceedings of the Australasian Conference on Robotics and Automation, 2007, pp. 6.

(Continued)

*Primary Examiner* — Paul Berardesca
(74) *Attorney, Agent, or Firm* — Peter Taylor; Micky Minhas

(57) ABSTRACT

Methods and systems for face detection and tracking using an image-based capture device are disclosed herein. The method includes generating a depth image of a scene, generating a mask image from the depth image, and detecting a position of a face of a user in the scene using the mask image. The method also includes determining an intensity of the face using a first color channel of the mask image and adjusting a gain level of a first color channel of the image-based capture device directed at the scene to achieve a target intensity of the face.

18 Claims, 6 Drawing Sheets

(56) References Cited

U.S. PATENT DOCUMENTS

| | | |
|---|---|---|
| 2007/0263097 A1 | 11/2007 | Zhao et al. |
| 2008/0294017 A1* | 11/2008 | Gobeyn et al. ............... 600/301 |
| 2009/0003652 A1 | 1/2009 | Steinberg et al. |
| 2009/0244309 A1* | 10/2009 | Maison et al. ............. 348/222.1 |
| 2010/0328442 A1 | 12/2010 | Yang et al. |
| 2011/0293179 A1* | 12/2011 | Dikmen et al. ............... 382/167 |

OTHER PUBLICATIONS

Stinson, Jim., "Camera Work: Letting in Some Light", Retrieved at <<http://www.videomaker.com/article/1405/>>, Feb. 1995, pp. 4.

"Low Light Optimization and Day / Night Operation", Retrieved at <<http://204.225.221.12/docs/LowLightOptimization.html>>, Retrieved Date: Sep. 15, 2011, pp. 3.

\* cited by examiner

100

FACE DETECTION AND TRACKING

BACKGROUND

Many computing applications, such as computer games, multimedia applications, office applications, or the like, use controls to allow users to manipulate game characters or other aspects of the particular computing application. Typically such controls are based on user input, for example, using controllers, remotes, keyboards, mice, or the like. Unfortunately, such controls may be difficult to learn, thus creating a barrier between a user and such computing applications. Furthermore, such controls may be different than actual game actions or other computing application actions for which the controls are used. Newer technologies for active depth sensing, such as the Kinect™ system from Microsoft® Corporation, have improved three-dimensional reconstruction approaches though the use of structured light (i.e., active stereo) to extract geometry from the video scene as opposed to passive methods, which exclusively rely upon image data captured using video cameras under ambient or natural lighting conditions. Structured light approaches allow denser depth data to be extracted for the generation of free viewpoint video (FVV), since the light pattern provides additional texture on the scene for denser stereo matching. By comparison, passive methods usually fail to produce reliable data at surfaces that appear to lack texture under ambient or natural lighting conditions. Because of the ability to produce denser depth data, active stereo techniques tend to require fewer cameras for high-quality three-dimensional (3D) scene reconstruction.

However, while the use of active stereo techniques has provided for the generation of high-quality 3D scene reconstruction, poor lighting conditions within a scene often prevent the color camera from capturing color images which are sufficient for quality face tracking results. Rather, the detection of such specific details of a scene may be successful only when the scene is properly lit. Moreover, many computing applications may benefit from the extraction of such details from a scene.

SUMMARY

The following presents a simplified summary of the innovation in order to provide a basic understanding of some aspects described herein. This summary is not an extensive overview of the claimed subject matter. It is intended to neither identify key nor critical elements of the claimed subject matter nor delineate the scope of the subject innovation. Its sole purpose is to present some concepts of the claimed subject matter in a simplified form as a prelude to the more detailed description that is presented later.

An embodiment provides a method for face detection and tracking using an image-based capture device. The method includes generating a depth image of a scene, generating a mask image from the depth image, and detecting a position of a face of a user in the scene using the mask image. The method also includes determining an intensity of the face using a first color channel of the mask image and adjusting a gain level of a first color channel of the image-based capture device directed at the scene to achieve a target intensity of the face.

Another embodiment provides a face detection and tracking system. The system includes an image-based capture device, wherein the image-based capture device includes a camera component that generates a depth image and a color image of a scene. The system also includes a computing device in operative communication with the image-based capture device. The computing device includes a processor configured to generate a mask image from the depth image and the color image, detect a position of a face of a user in the scene using the mask image, determine an intensity of the face using a green color channel of the mask image, and direct the image-based capture device to adjust a green gain level of the green color channel to achieve a target intensity of the face.

In addition, another embodiment provides one or more non-volatile computer-readable storage media for storing computer readable instructions, wherein the computer-readable instructions provide a face detection and tracking system when executed by one or more processing devices. The computer-readable instructions include code configured to detect a position of a face of a user within a capture area using a face detection module and to adjust a gain level of a first color channel of an image-based capture device using a settings adjustment module to achieve a target intensity of the face. The computer-readable instructions also include code configured to adjust at least a second color channel gain level of the image-based capture device using the settings adjustment module to achieve a color balance of the face based on the target intensity.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Numbers in the 100 series refer to features originally found in FIG. 1, numbers in the 200 series refer to features originally found in FIG. 2, numbers in the 300 series refer to features originally found in FIG. 3, and so on.

DETAILED DESCRIPTION

As discussed above, many computing applications may benefit from the extraction of specific details, such as facial expressions of a user, from a scene. Current face tracking systems often utilize depth and color images from two linked and calibrated cameras to detect and track a user's face. However, while the face tracking system is reliable in well-lit conditions, the system's ability to detect and track a user's face may be compromised in poorly-lit conditions.

Embodiments disclosed herein set forth a method and system for face detection and tracking in suboptimal lighting environments. The current method and system relies on the dynamic adjustment of the red, green, and blue gain levels and exposure time of an image-based capture device or, more specifically, of a color camera (i.e., RGB camera) within an image-based capture device. The adjustment of these settings is based on the image region comprising the user's face, rather than the full frame of the camera. Further, in cases where the environment is too dim or is backlit, the current method and system may provide feedback to the user, so that the user may adjust the lighting of the environment.

In embodiments, an image-based capture device may be used for the face detection and tracking system disclosed herein. The image-based capture device may include an infrared (IR) camera, an IR laser projector, and an RGB camera. Moreover, the IR camera and the IR laser projector may be genlocked. The term "genlocking" is commonly used to describe a technique for maintaining temporal coherence between two or more signals, i.e., synchronization between the signals. Genlocking of the IR camera and the IR laser projector in the image-based capture device ensures that the IR camera detects depth information from the deformation of the IR laser pattern at the correct instant in time. This ensures that meshes of moving objects will have the appropriate shape and texture at any given time during subsequent video navigation. Further, it should be noted that either a software or a hardware synchronization system such as a genlock may be used to maintain temporal coherence between the cameras within the image-based capture device.

Figure 1:
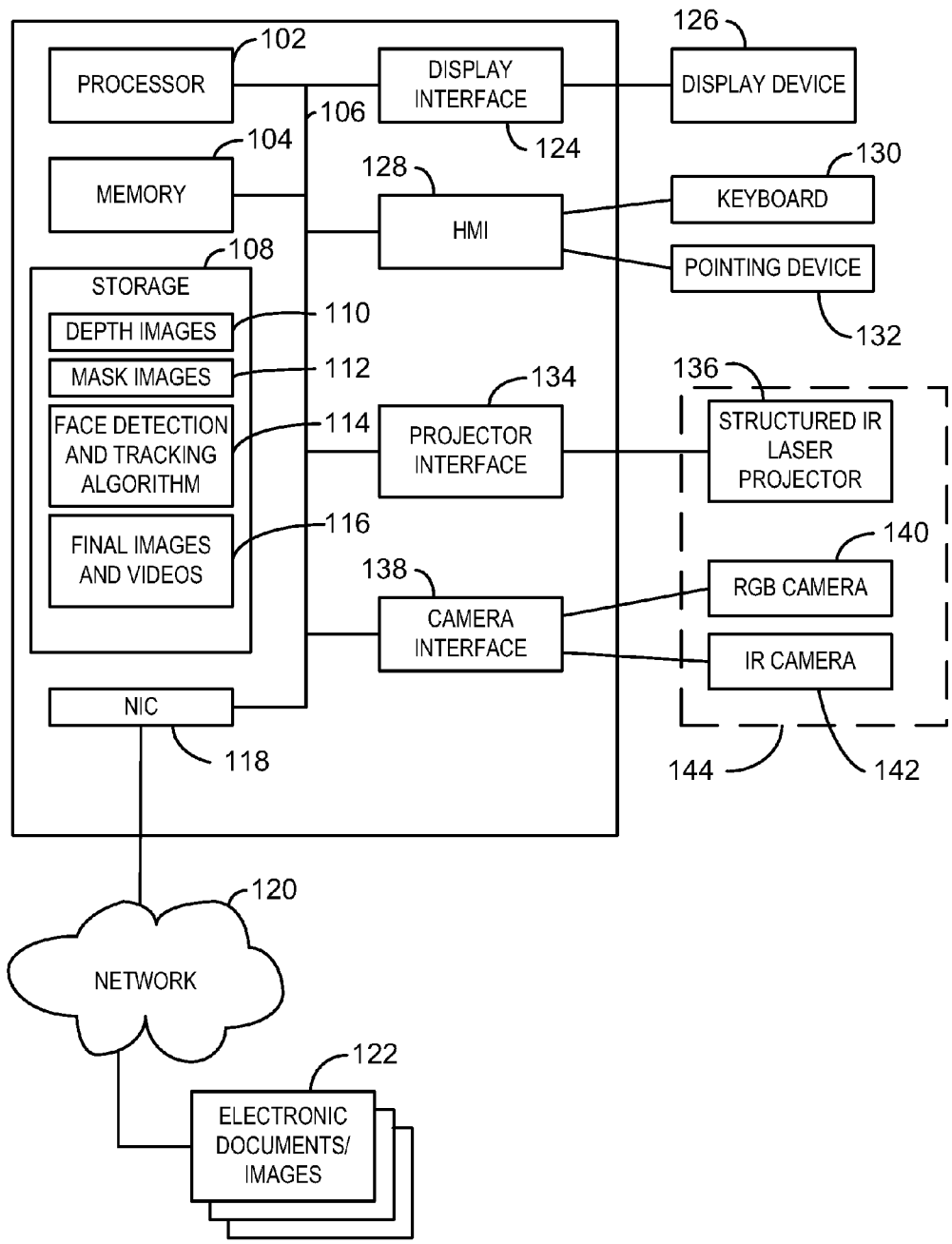
FIG. 1 is a block diagram of a system for face detection and tracking within a computing environment.

As a preliminary matter, some of the figures describe concepts in the context of one or more structural components, variously referred to as functionality, modules, features, elements, etc. The various components shown in the figures can be implemented in any manner, for example, by software, hardware (e.g., discreet logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, manual processing, and the like, or any combination of these implementations. As used herein, hardware may include computer systems, discreet logic components, such as application specific integrated circuits (ASICs), and the like, as well as any combinations thereof.

As to terminology, the phrase "configured to" encompasses any way that any kind of functionality can be constructed to perform an identified operation. The functionality can be configured to perform an operation using, for instance, software, hardware, firmware and the like, or any combinations thereof.

The term "logic" encompasses any functionality for performing a task. For instance, each operation illustrated in the flowcharts corresponds to logic for performing that operation. An operation can be performed using, for instance, software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware.

By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any non-transitory computer-readable device, or media.

Non-transitory computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not necessarily storage media) may additionally include communication media such as transmission media for wireless signals and the like.

FIG. 1 is a block diagram of a system 100 for face detection and tracking within a computing environment. The system 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The memory device 104 can include random access memory (RAM), read only memory (ROM), flash memory, or any other suitable memory systems. These instructions implement a method that includes generating a depth image of a scene, generating a mask image from the depth image, detecting a position of a face of a user in the scene using the mask image, and determining an intensity of the face using a first color channel of the mask image. The method further includes adjusting one or more gain levels or an exposure time, or both, of the image-based capture device to achieve a target intensity, color balance, and light level of the face. The processor 102 is connected through a bus 106 to one or more input and output devices.

The system 100 may also include a storage device 108 adapted to store depth images 110, mask images 112, a face detection and tracking algorithm 114, and the final images or videos 116 generated by the system 100. The storage device 108 can include a hard drive, an optical drive, a thumbdrive, an array of drives, or any combinations thereof. A network interface controller 118 may be adapted to connect the system 100 through the bus 106 to a network 120. Through the network 120, electronic text and imaging input documents 122 may be downloaded and stored within the computer's storage system 108. In addition, the system 100 may transfer any of the images or videos 110, 112, or 116 within the storage device 108 over the network 120.

The system 100 may be linked through the bus 106 to a display interface 124 adapted to connect the system 100 to a display device 126, wherein the display device 126 may include a computer monitor, camera, television, projector, virtual reality display, or mobile device, among others. The display device 126 may also be a three-dimensional, stereoscopic display device. A human machine interface 128 within the stereo module system 100 may connect the system to a keyboard 130 and pointing device 132, wherein the pointing device 132 may include a mouse, trackball, touchpad, joy stick, pointing stick, stylus, or touchscreen, among others. It should also be noted that the system 100 may include any number of other components, including a printing interface adapted to connect the system 100 to a printing device or a gaming interface adapted to connect the system 100 to a gaming device, among others.

The system 100 may also be linked through the bus 106 to a projector interface 134 adapted to connect the system 100 to a structured IR laser projector 136 or any other type of projector. In addition, a camera interface 138 may be adapted to connect the system 100 to two or more cameras, including an RGB camera 140 and an IR camera 142. The structured IR laser projector 136, RGB camera 140, and IR camera 142 may be included within an image-based capture device 144. In an embodiment, the system 100 may be connected to multiple image-based capture devices 144 at one time. In another embodiment, each image-based capture device 144 may be connected to a separate system 100. In other words, any number of systems 100 may be connected to any number of image-based capture devices 144. In an embodiment, each image-based capture device 144 may include local storage on the module, such that each image-based capture device 144 may store an independent view of the scene locally. Further, in another embodiment, the entire system 100 may be included within the image-based capture device 144. Any number of additional image-based capture devices may also be connected to the image-based capture device 144 through the network 120.

Figure 2:
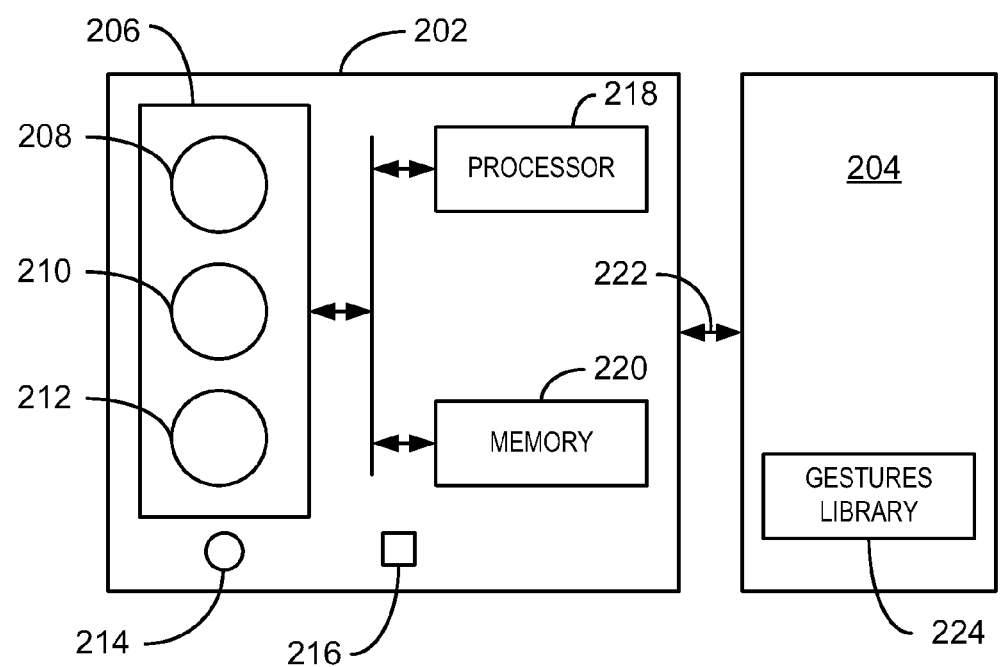
FIG. 2 is a block diagram of an image-based capture device in operative communication with a computing device.

FIG. 2 is a block diagram 200 of an image-based capture device 202 in operative communication with a computing device 204. In embodiments, the computing device 204 may be a desktop computer, a laptop computer, a gaming device, or a mobile device. The computing device 204 may include a processor, memory, storage system, and the like. The image-based capture device 202 may be configured to capture video with depth information, including a depth image that may include depth values. In embodiments, the image-based capture device may capture the video with the depth information using any of a variety of suitable techniques, such as, for example, time-of-flight techniques, structured light techniques, stereo imaging techniques, or the like. According to one embodiment, the image-based capture device 202 may organize the calculated depth information into "Z layers," or layers that may be perpendicular to a Z axis extending along the line of sight of a depth camera, such as an IR camera connected to an IR projector.

In embodiments, the camera component 206 of the image-based capture device 202 may include an IR laser projector 208, an IR camera 210, and an RGB camera 212 that may be used to capture a depth image of a scene. For example, the IR laser projector 208 may emit infrared light onto a scene, and the IR camera 210 and the RGB camera 212 may be used to detect the backscattered light from the surface of one or more target objects in the scene. In some embodiments, pulsed infrared light may be used such that the time between an outgoing light pulse and a corresponding incoming light pulse may be measured and used to determine a physical distance from the image-based capture device 202 to a particular location on the targets or objects in the scene. Additionally, in other example embodiments, the phase of the outgoing light wave may be compared to the phase of the incoming light wave to determine a phase shift. The phase shift may then be used to determine a physical distance from the image-based capture device 202 to a particular location on the targets or objects.

Further, in some embodiments, the camera component 206 of the image-based capture device 202 may include multiple RGB cameras. Multiple RGB cameras may be used to infer the depth image via stereopsis. Stereopsis is the process of creating a three-dimensional (or "stereo") view (or "opsis") of a scene from two or more different perspectives. For example, the three-dimensional view of the scene may be acquired by generating a depth map using a method for disparity detection between the images captured from the different perspectives.

According to another example embodiment, time-of-flight analysis may be used to indirectly determine a physical distance from the image-based capture device 202 to a particular location on the targets or objects by analyzing the intensity of the reflected beam of light over time via various techniques including, for example, shuttered light pulse imaging. According to yet another embodiment, the image-based capture device 202 may include two or more physically separated cameras that may view a scene from different angles in order to obtain visual stereo data that may be resolved to generate depth information.

In another example embodiment, the image-based capture device 202 may use structured light projected from the IR laser projector 208 to capture depth information. In such an analysis, the IR laser projector 208 may project patterned light, i.e., light displayed as a known pattern such as grid pattern or a dot pattern, onto the scene. Upon striking the surface of one or more targets or objects in the scene, the pattern may become deformed in response. Such a deformation of the pattern may be captured by, for example, the IR camera 210 and may then be analyzed to determine a physical distance from the capture device to a particular location on the targets or objects.

The image-based capture device 202 may further include a microphone 214. The microphone 214 may include a transducer or sensor that may receive and convert sound into an electrical signal. According to one embodiment, the microphone 214 may be used to reduce feedback between the image-based capture device 202 and the computing device 204. Additionally, the microphone 214 may be used to receive audio signals that may also be provided by the user to control applications, such as game applications, non-game applications, or the like, that may be executed by the computing device 204.

The image-based capture device 202 may further include a feedback component 216. The feedback component 216 may comprise a light, such as an LED or a light bulb, a speaker, or the like. The feedback component 216 may perform at least one of changing colors, turning on or off, increasing or decreasing in brightness, and flashing at varying speeds. The feedback component 216 may also comprise a speaker which may provide one or more sounds or noises as a feedback of one or more states. The feedback component 216 may also work in combination with the computing device 204 to provide one or more forms of feedback to a user by means of any other element of the image-based capture device 202. For example, in embodiments, the feedback component 216 may include a light that turns on in the case of poor lighting conditions or a speaker that makes a certain sound when the lighting conditions are too dim for the image-based capture device 202 to function properly.

In an example embodiment, the image-based capture device 202 may further include a processor 218 that may be in operative communication with the camera component 206. The processor 218 may include a standardized processor, a specialized processor, a microprocessor, or the like, that may execute instructions for receiving the depth image, determining whether a suitable target may be included in the depth image, converting the suitable target into a skeletal representation or model of the target, detecting the presence and position of the face of a user within the depth image, or any other suitable instruction.

The image-based capture device 202 may further include a memory component 220 that may store the instructions that may be executed by the processor 218, images or frames of images captured by the IR camera 210 or the RGB camera 212, user profiles, or any other suitable information, images, or the like. According to an example embodiment, the memory component 220 may include random access memory (RAM), read only memory (ROM), cache, Flash memory, a hard disk, or any other suitable storage component. As shown in FIG. 2, in one embodiment, the memory component 220 may be a separate component in communication with the camera component 206 and the processor 218. According to another embodiment, the memory component 220 may be integrated into the processor 218 or the camera component 206.

As shown in FIG. 2, the image-based capture device 202 may be in communication with the computing device 204 via a communication link 222. The communication link 222 may be a wired connection, such as, for example, a USB connection or an Ethernet cable connection, or a wireless connection. According to one embodiment, the computing device 204 may provide a clock to the image-based capture device 202 that may be used to determine, for example, when to capture a scene via the communication link 222.

Additionally, the image-based capture device 202 may provide the depth information and images captured by, for example, the IR camera 210 and the RGB camera 212, to the computing device 204 via the communication link 222. The computing device 204 may then use the depth information and images to generate a skeletal model. Moreover, the computing device 204 may use the skeletal model, depth information, and captured images to, for example, create a virtual screen, adapt the user interface, and control an application such as a game or word processor. For example, as shown in FIG. 2, the computing device 204 may include a gestures library 224. The gestures library 224 may include a collection of gesture filters, each including information concerning a gesture that may be performed by the skeletal model as the user moves. The data captured by the camera component 206 in the form of the skeletal model and movements associated with it may be compared to the gesture filters in the gesture library 224 to identify when a user (as represented by the skeletal model) has performed one or more gestures. Those gestures may be associated with various controls of an application. Thus, the computing device 204 may use the gestures library 224 to interpret movements of the skeletal model and to control an application based on the movements. In embodiments, movements of the position of the head of the skeletal model may be interpreted by the gestures library 224 in order to track the face of a user of the application as the user moves.

In addition, the gestures library 224 may also be used to interpret specific movements of the user's facial features in order to provide feedback to the user or to a remote user interacting with the user through a remote application connected through the network.

Figure 3:
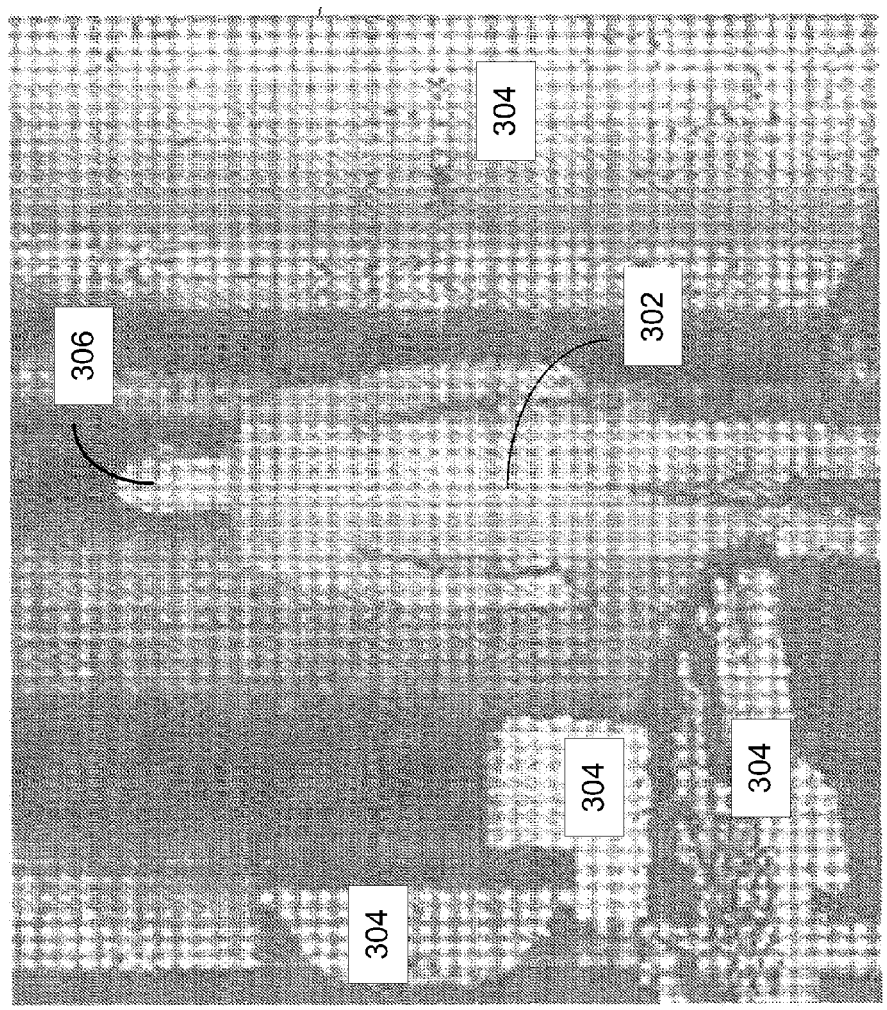
FIG. 3 illustrates an example embodiment of a depth image that may be generated by the image-based capture device.

FIG. 3 illustrates an example embodiment of a depth image 300 that may be generated by the image-based capture device 202. The depth image 300 may also be received by the computing device 204 for processing. According to an example embodiment, the depth image 300 may be an image or frame of a scene captured by, for example, the IR camera 210 or the RGB camera 212 of the image-based capture device 202 described above with respect to FIG. 2. As shown in FIG. 3, the depth image 300 may include a human target 302 and one or more non-human targets 304, such as a wall, a table, a monitor, or the like, in the captured scene. As described above, the depth image 300 may include a plurality of observed pixels, where each observed pixel has an observed depth value associated therewith. For example, the depth image 300 may include a two-dimensional (2-D) pixel area of the captured scene, where each pixel in the 2-D pixel area may represent a depth value, such as a length or distance in, for example, centimeters, millimeters, or the like, of a target or object in the captured scene from the image-based capture device 202.

According to one embodiment, the depth image 300 may be used to determine the shape and size of a target. In another embodiment, the depth image 300 may be used to determine the body poses of a user. The body may be divided into a series of segments, and each pixel of the depth map 300 may be assigned a probability that it is associated with each segment. This information may be provided to one or more processes, which may determine the location of nodes, joints, centroids or the like to determine a skeletal model and interpret the motions of the user, i.e., the human target 302, for pose- or gesture-based command. In embodiments, the position of the head 306 of the human target 302 may be determined and sent to the computing device 204 or the system 100 for face detection and tracking.

In one embodiment, upon receiving the depth image 300, the computing device 204 or the face detection and tracking system 100 may downsample the depth image 300 to a lower processing resolution, such that the depth image 300 may be more easily used or more quickly processed with less computing overhead. Additionally, one or more high-variance or noisy depth values may be removed or smoothed from the depth image 300, portions of missing or removed depth information may be filled in or reconstructed; or any other suitable processing may be performed on the received depth image 300. For example, in an embodiment, gamma correction of the depth image 300 may be performed in order to make the depth image 300 more suitable for human viewing purposes.

Figure 4:
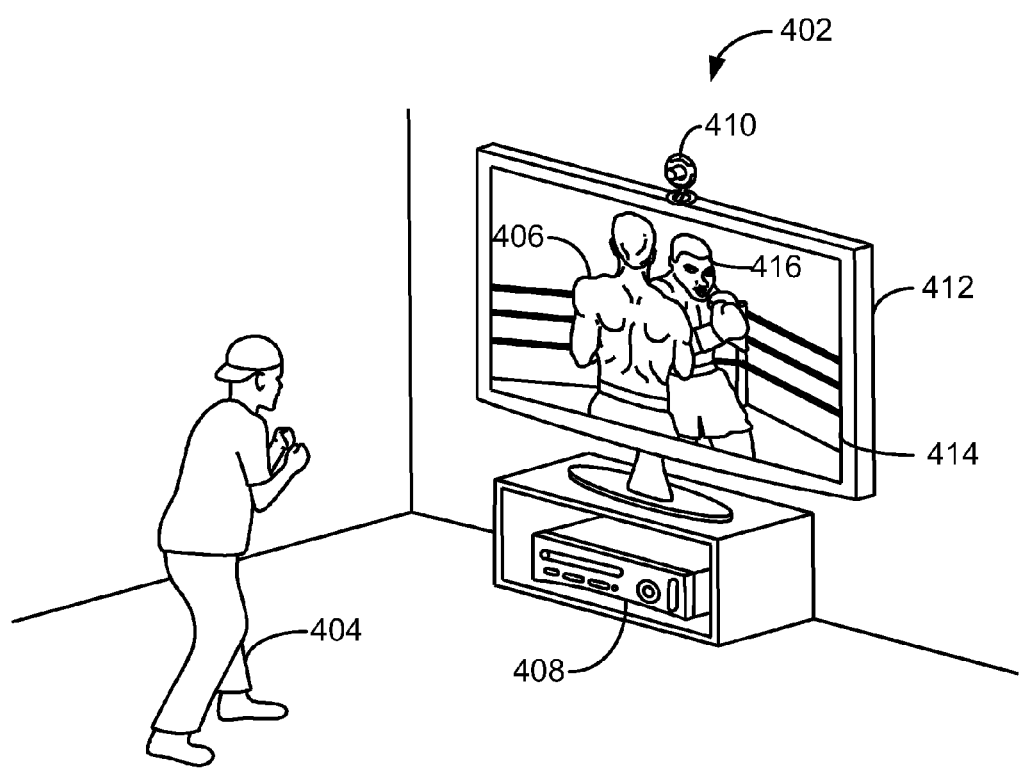
FIG. 4 illustrates an example embodiment of a configuration and application of a gesture-based system, wherein the gesture-based system includes a face detection and tracking system.

FIG. 4 illustrates an example embodiment 400 of a configuration and application of a gesture-based system 402, wherein the gesture-based system 402 includes a face detection and tracking system. In the example embodiment 400, a user 404 is playing an interactive boxing game. The gesture-based system 402 may be may be used to create an avatar 406 of the user 404, wherein the avatar 406 is a graphical representation of the user 404. The gesture-based system may allow the avatar 406 to mimic or copy the movements of the user 404 in real-time as the user 404 plays the interactive boxing game. The gesture-based system 402 may include a computing device 408 and an image-based capture device 410. The computing device 408 may be a computer, a gaming system, a console, or the like. According to an example embodiment, the computing device 408 may include hardware components or software components, such that the computing device 408 may be used to execute applications, such as gaming applications, non-gaming applications, or the like. The image-based capture device 410 may include one or more cameras, projectors, detectors, or the like, and may be used to monitor one or more users, such as the user 404, and to capture gestures performed by the one or more users. For example, the actions of the user 404 may be tracked to provide feedback to the user 404. An audiovisual device 412 may be used to provide feedback to the user 404. For example, the avatar 406 of the user 404 may be displayed on a display screen 414 of the audiovisual device 412.

In embodiments, a remote user (not shown) may interact with the user 404 through a remote gesture-based system (not shown), wherein the remote gesture-based system may be in operative communication with the gesture-based system 402. An avatar 416 of the remote user may be generated by the remote gesture-based system and may be provided as feedback to the user 404 through, for example, the audiovisual device 412. In addition, in embodiments, the avatar 406 of the user 404 may be provided as feedback to the remote user using the remote gesture-based system.

As discussed above, a face detection and tracking system may be integrated within the gesture-based system 402. The face detection and tracking system may be used to detect and track the features and expressions of the face of the user 404. In embodiments, the face detection and tracking system may provide feedback to the user 404 by causing the user's avatar 406 to mimic or copy the facial expressions of the user 404. In addition, a face detection and tracking system may also be integrated within the remote gesture-based system and may be used to detect and track the features and expressions of the face of the remote user. Feedback may be provided to both the remote user and the user 404. For example, the avatar 416 of the remote user may mimic the facial expressions of the remote user. This may allow the user 404 to view the facial expressions of the remote user on the display screen 414 of the audiovisual device 412 as the user 404 interacts with the remote user through the gesture-based system 402. Moreover, the remote user may also be able to view the facial expressions of the user 404 through the user's avatar 406 using the remote gesture-based system, as well as a remote audiovisual device (not shown).

In embodiments, the face detection and tracking system may provide feedback to the user 404 when the lighting conditions within the environment are not sufficient to enable accurate detection and tracking of the facial expressions of the user 404. In the case of low lighting conditions, the face detection and tracking system may automatically adjust certain settings, such as the gain level and the exposure time, of the image-based capture device 410 according to instructions generated by the computing device 408, as discussed further with respect to FIG. 5. In an embodiment, the image-based capture device 410 may also include a light, which may be automatically activated in low lighting conditions in order to provide additional light for the face detection and tracking system. In another embodiment, feedback to the user 404 may be provided in the form of a message displayed on the display screen 414 of the audiovisual device 412. The message may inform the user 404 of the poor lighting conditions and request the user 404 to increase the amount of light within the environment.

Figure 5:
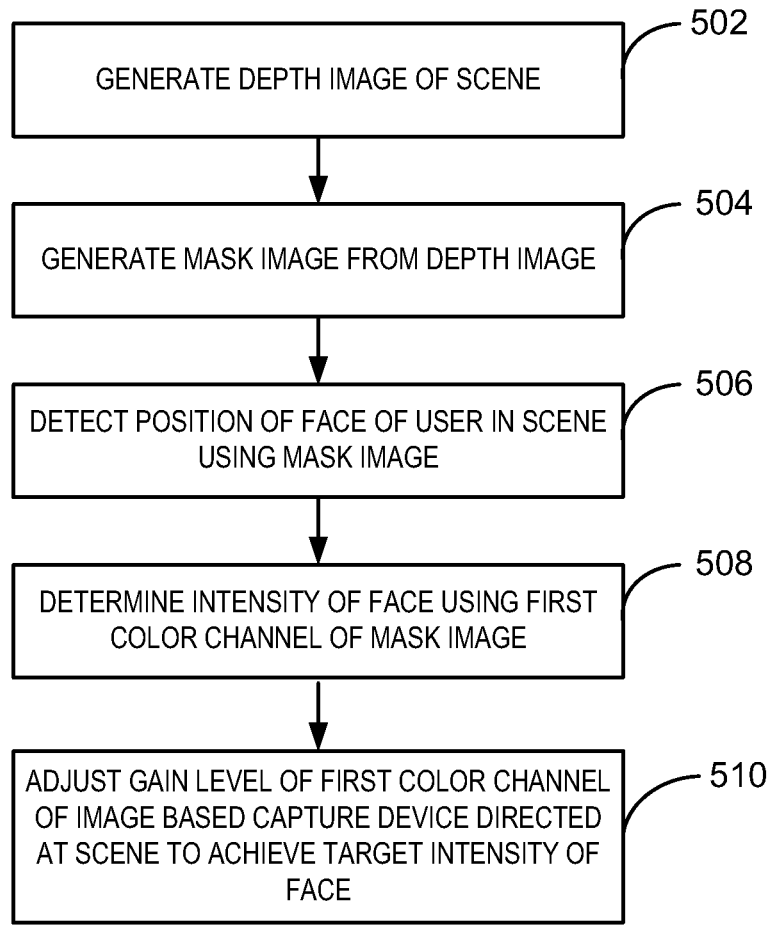
FIG. 5 is a process flow diagram showing a method for face detection and tracking using an image-based capture device.

FIG. 5 is a process flow diagram showing a method 500 for face detection and tracking using an image-based capture device. The method 500 may utilize real-time depth and color images from two linked and calibrate cameras. The depth images may be generated using an IR camera and an IR projector, while the color images may be generated using an RGB camera. Moreover, the method 500 may allow for the successful detection and tracking of the face of a user in poor lighting conditions.

The method may begin at block 502 with the generation of a depth image of a scene. As discussed above, the depth image may be generated using an IR camera and an IR projector. In embodiments, the IR projector may project a structured IR laser pattern onto a scene, wherein the laser pattern may include dots, stripes, a grid, or any other recognizable structured pattern of IR light. The IR camera may then be used to generate the depth image by capturing the deformation of the structured IR laser pattern as the pattern hits target objects within the scene. Based on the deformation of the structured IR laser pattern, the relative depths of objects within the scene, as well as the shapes of the objects, may be determined.

At block 504, a mask image may be generated from the depth image. In addition, a color image captured by the RGB camera simultaneously with the depth image may be used to create the mask image. In embodiments, gamma correction of the color image may be automatically performed by the image-based capture device in order to maximize the use of bits within the image relative to how humans perceive light and color. This may enhance the appearance of the images on a display screen. In embodiments, for the gamma correction, each color channel of each pixel may be scaled to range from [0, 1] and raised to the power of 2.2.

At block 506, the position of a face of a user in the scene may be detected using the mask image. The mask image may indicate the proximate region of the face of the user based on the shapes and colors within the mask image. Moreover, the mask image may be used to differentiate the face of the user from the background within the scene. In embodiments, the position of the entire head of the user may first be approximated according to the skeletal model discussed above, and color information generated by the RGB camera may then be used to narrow the area down to just the user's face.

At block 508, an intensity of the face may be determined using a first color channel of the mask image. The gamma correction performed by the image-based capture device may be undone prior to determining the intensity of the first color channel. In embodiments, the gamma correction may be undone in order to cause the luminance of the pixels within the image to be linear. A mean intensity and a median intensity of the user's face may be determined using the first color channel. Then, the mean intensity and the median intensity may be averaged to give the current intensity of the user's face. In embodiments, the first color channel may be the green color channel.

At block 510, the gain level of the first color channel of the image-based capture device directed at the scene may be adjusted in order to achieve a target intensity of the user's face. A base-2 logarithmic change of the gain level produces a change that is linear in the captured color image and, thus the mask image. In embodiments, once the intensity of the face has been determined using the green color channel, as discussed above, it may be used to drive the green gain of the camera in order to achieve a certain target intensity of the face. A fraction, i.e., around 60%, of the old green gain level and the remaining fraction, i.e., around 40%, of the new green gain level may be used to provide some hysteresis for filtering. The filtering may be performed to help suppress unwanted forced oscillation of the gain level of the image-based capture device. In embodiments, such unwanted forced oscillation of the gain level may occur due to the delay in receiving the results after updating the gain level. In embodiments, the following code fragment may be utilized to perform the steps at blocks 508 and 510:

currentFaceIntensity=(greenGammaFix+greenMedianGammaFix)/2.0;
    FaceTargetIntensity=0.065;
    desiredGreenGain=oldGreenGain+FaceTargetIntensity−currentFaceIntensity;
    Hysteresis=0.60;
    filteredGreenGain=Hysteresis*oldGreenGain+(1.0−Hysteresis)*desiredGreenGain;

In embodiments, the hysteresis may filter the adjustment of the gain level by causing the adjustment to occur more slowly by taking the most recent old gain level into account. As discussed above, this may prevent unwanted forced oscillation of the gain level by causing the image-based capture device to react more slowly to changing conditions.

It should be understood that the method 500 is not intended to indicate that the steps of the method 500 should be executed in any particular order or that all of the steps must be present in every case. Further, steps may be added to the method 400 according to the specific application. For example, an exposure time of the image-based capture device may be adjusted to improve a light level of the face. In embodiments, if the filtered green gain level exceeds a "high water mark" threshold, which indicates that the user is in a dim environment, the exposure time may be increased. For example, in such a dim environment, the exposure time of the image-based capture device may be increased from 33.3 milliseconds to 66.6 milliseconds, reducing the frame rate of the camera from 30 frames per second (fps) to 15 fps. In other embodiments, if the filtered green gain level is below a "lower water mark" threshold, the exposure time may be decreased. For example, the exposure time of the image-based capture device may be decreased from 66.6 milliseconds to 33.3 milliseconds. When the exposure time of the image-based capture device is increased or decreased, the filtered green gain level is compensated by adding or subtracting a value in anticipation of the change in the amount of light collected by the image-based capture device. In embodiments, the following code fragment may be used to adjust the exposure time:

```
GainLowWaterMark = 0.0;
GainHighWaterMark = 0.8;
newExposureTime = oldExposureTime;
if (newGreenGain > GainHighWaterMark)
{
    newExposureTime = 1000.0 / 15.0;    // (66.6 ms)
}
else if (newGreenGain < GainLowWaterMark)
{
    newFrameRate = 1000.0 / 30.0;    // (33.3 ms)
}
GainFromExposure = 0.8;
filteredGreenGain = filteredGreenGain − GainFromExposure *
    min(GainHighWaterMark − GainLowWaterMark,
    max(GainLowWaterMark − GainHighWaterMark, log
    (newExposure / oldExposureTime) / log(2.0)));
```

In addition, in embodiments, at least a second color channel gain level of the image-based capture device may be adjusted to achieve a color balance of the face based on the target intensity. This step may be performed in order to ensure that the hue of the image of the user's face does not appear unnatural due to the adjustment of the gain level of the first color channel. For example, if the green gain level of the green color channel is adjusted, the blue gain level of the blue color channel and the green gain level of the green color channel may also be adjusted in order to achieve a basic white balance of the image of the user's face. In embodiments, if it is assumed that the color of the face of the user is a basic skin color, the blue and red gain levels may be adjusted such that a fixed difference between the blue and red gain levels and the green gain level is achieved. In another embodiment, a basic white balance algorithm may be used to maintain the same deltas, or differences, between the red gain level, the blue gain level, and the green gain level that is found in the current environment of the full image frame. For this embodiment, the red gain level may be updated according to the following code fragment:

newRedGain=filteredGreenGain+InitialRedGain−InitialGreenGain;

In embodiments, accurate white balance may be sacrificed in order to reduce the image noise by limiting the deltas from the red and blue gain levels to the green gain level, as shown by the following code fragment:

MaxGainDifferenceFromGreen=0.58;
    newRedGain=min(newGreenGain+MaxGainDifferenceFromGreen, newRedGain);

In embodiments, in spite of the aforementioned efforts to adapt the image-based capture device to poor lighting conditions, the capture of a user's face may sometimes be unsuccessful. For example, if the user is in a very dark room, there may not be enough photons in the room for the image-based capture device to capture the user's face at any gain level or exposure time. As another example, the image-based capture device may not be able to capture the user's face at any setting in backlit situations. A backlit situation is one in which there is not enough light on the user's face, while there is too much light on the area surrounding the user's face.

In order to correct for the aforementioned problem of too little environmental lighting for the image-based capture device to capture the face of the user at any setting, feedback may be provided to the user to notify the user to take an action to improve the lighting of the environment. In an embodiment, a message may be displayed on a display device to inform the user to increase the light level in the room. In another embodiment, a red light may be activated on the image-based capture device to indicate that the light level is too low for the image-based capture device to function properly. In yet another embodiment, the image-based capture device may include a built-in light, which may be activated automatically in poor lighting conditions.

In embodiments, a computing device may be used to continuously estimate the light level of the user's face based on a green gain level, a blue gain level, a red gain level, and an exposure time of the image-based capture device. Specifically, the overall light level of the user's face may be approximated by combining the mean gamma-adjusted red, green, and blue gain color levels with the respective gain levels and exposure time, as shown by the following code fragment:

estimatedFaceLight=1000.0*
    (0.30*redFaceGammaFix*powf(2.0, −gainRed+0.59*greenFaceGammaFix*powf(2.0, −gainGreen)+0.11*blueFaceGammaFix*powf(2.0, −gainBlue))/oldExposureTime;

A similar computation may also be used to determine the overall light level of the area surrounding the user's face in order to determine whether a backlit situation is present. In embodiments, a user may be considered to be in a backlit situation if the estimated overall light level of the user's face is less than a quarter of the estimated surrounding light. In other embodiments, a user may be considered to be in an environment that is too dark if the estimated overall light level of the user's face is below a minimum threshold, for example, around 0.3 on a scale of 0 to 1, or if the green gain level exceeds a threshold value, for example, around 2.9. If backlighting or a dark environment is detected, the user may be notified by any number of different techniques, including the feedback techniques mentioned above.

Figure 6:
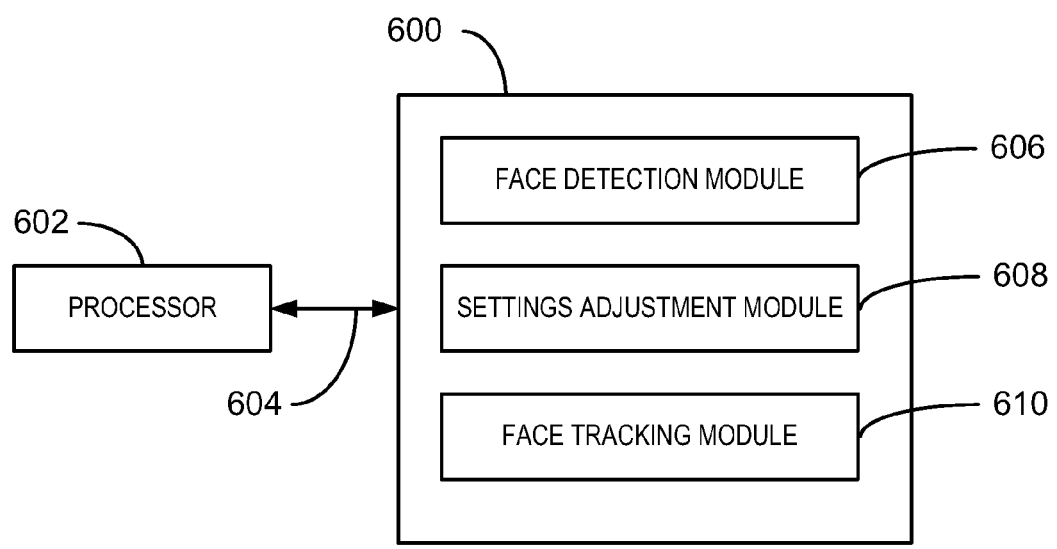
FIG. 6 is a block diagram showing a tangible, computer-readable medium that stores code adapted to detect and track the face of a user in an image captured by an image-based capture device.

FIG. 6 is a block diagram showing a tangible, computer-readable medium 600 that stores code adapted to detect and track the face of a user in an image captured by an image-based capture device. The tangible, computer-readable medium 600 may be accessed by a processor 602 over a computer bus 604. Furthermore, the tangible, computer-readable medium 600 may include code configured to direct the processor 602 to perform the steps of the current method.

The various software components discussed herein may be stored on the tangible, computer-readable medium 600, as indicated in FIG. 6. For example, a face detection module 606 may be configured to detect a position of a face of a user within a capture area. A settings adjustment module 608 may be configured to adjust a gain level of a first color channel of an image-based capture device to achieve a target intensity of the face and to adjust at least a second color channel gain level of the image-based capture device to achieve a color balance of the face based on the target intensity. The settings adjustment module 608 may also be configured to adjust an exposure time of the image-based capture device to improve a light level of the face. Further, a face tracking module 610 may be configured to track movements, features, and expressions of the face of the user.

It should be noted that the block diagram of FIG. 6 is not intended to indicate that the tangible, computer-readable medium 600 must include all the software components 606, 608, and 610. In addition, the tangible, computer-readable medium 600 may include additional software components not shown in FIG. 6. For example, the tangible, computer-readable medium 600 may also include a light adjustment module. In embodiments, the light adjustment module may be configured to activate a light within the image-based capture device if the lighting of the environment is too dim. In other embodiments, the light adjustment module may be configured to notify the user to adjust the light of the environment if the lighting is too dim.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for face detection and tracking using an image-based capture device, comprising:
   generating a depth image of a scene;
   generating a mask image from the depth image;
   detecting a position of a face of a user in the scene using the mask image;
   determining an intensity of the face using a first color channel of the mask image by undoing a gamma correction of the mask image and averaging a mean intensity and a median intensity of the face within the mask image; and
   adjusting a gain level of the first color channel of the image-based capture device directed at the scene to achieve a target intensity of the face.

2. The method of claim 1, comprising adjusting an exposure time of the image-based capture device to improve a light level of the face.

3. The method of claim 2, comprising estimating the light level of the face based on a green gain level, a blue gain level, a red gain level, and an exposure time of the image-based capture device.

4. The method of claim 3, comprising increasing the exposure time of one or more cameras within the image-based capture device if the light level of the face is too low.

5. The method of claim 3, comprising providing feedback to the user if the light level of the face is above a first threshold value or below a second threshold value.

6. The method of claim 1, comprising:
   detecting a position of a face for each of a plurality of users in the scene using the mask image;
   determining an average of face intensities for the plurality of users using a first color channel of the mask image; and
   adjusting a gain level of a first color channel of the image-based capture device directed at the scene to achieve a target face intensity for the plurality of users.

7. The method of claim 1, wherein detecting the position of the face of the user in the scene using the mask image comprises locating a proximate region of the face of the user versus a background within the mask image.

8. A face detection and tracking system, comprising:
   an image-based capture device, comprising a camera component that generates a depth image and a color image of a scene; and
   a computing device in operative communication with the image-based capture device, wherein the computing device comprises a processor configured to:
   generate a mask image from the depth image and the color image;
   detect a position of a face of a user in the scene using the mask image;
   determine an intensity of the face using a green color channel of the mask image; and
   direct the image-based capture device to adjust a green gain level of the green color channel to achieve a target intensity of the face, wherein the target intensity of the face is determined by undoing a gamma correction of the mask image and averaging a mean intensity and a median intensity of the face within the mask image, wherein the mean intensity and the median intensity comprise intensities within the green color channel.

9. The face detection and tracking system of claim 8, wherein the computing device comprises a processor configured to direct the image-based capture device to adjust an exposure time to improve a light level of the face.

10. The face detection and tracking system of claim 9, wherein the computing device comprises a processor configured to direct the image-based capture device to increase an exposure time if a filtered green gain level of the green color channel exceeds a high water mark threshold.

11. The face detection and tracking system of claim 9, wherein the computing device comprises a processor configured to direct the image-based capture device to decrease an exposure time if a filtered green gain level of the green color channel is below a low water mark threshold.

12. The face detection and tracking system of claim 8, wherein the computing device comprises a processor configured to direct the image-based capture device to adjust a red gain level or a blue gain level, or both, to achieve a color balance of the face.

13. The face detection and tracking system of claim 8, wherein the computing device comprises a processor configured to direct the image-based capture device to adjust a red gain level and a blue gain level to a fixed difference from the green gain level to achieve a basic skin color balance of the face.

14. The face detection and tracking system of claim 8, wherein the image-based capture device comprises an IR projector, an IR camera, and an RGB camera, and wherein the IR projector, the IR camera, and the RGB camera are temporally synchronized.

15. One or more non-volatile computer-readable storage media for storing computer readable instructions, the computer-readable instructions providing a face detection and tracking system when executed by one or more processing devices, the computer-readable instructions comprising code configured to:
    generate a mask image from a depth image of a scene;
    detect a position of a face of a user within a capture area of the scene using a face detection module;
    determine an intensity of the face using a first color channel of the mask image by undoing a gamma correction of the mask image and averaging a mean intensity and a median intensity of the face within the mask image; and
    adjust a gain level of the first color channel of an image-based capture device using a settings adjustment module to achieve a target intensity of the face.

16. The computer-readable storage media of claim 15, wherein the computer-readable instructions comprise code configured to:
    adjust an exposure time of the image-based capture device using the settings adjustment module to improve a light level of the face.

17. The computer-readable storage media of claim 15, wherein the computer-readable instructions comprise code configured to:
    track movements and features of the face using a face tracking module.

18. The computer-readable storage media of claim 15, wherein the gain level of the first color channel comprises a green gain level of a green color channel.

\* \* \* \* \*